UNITED STATES PATENT OFFICE.

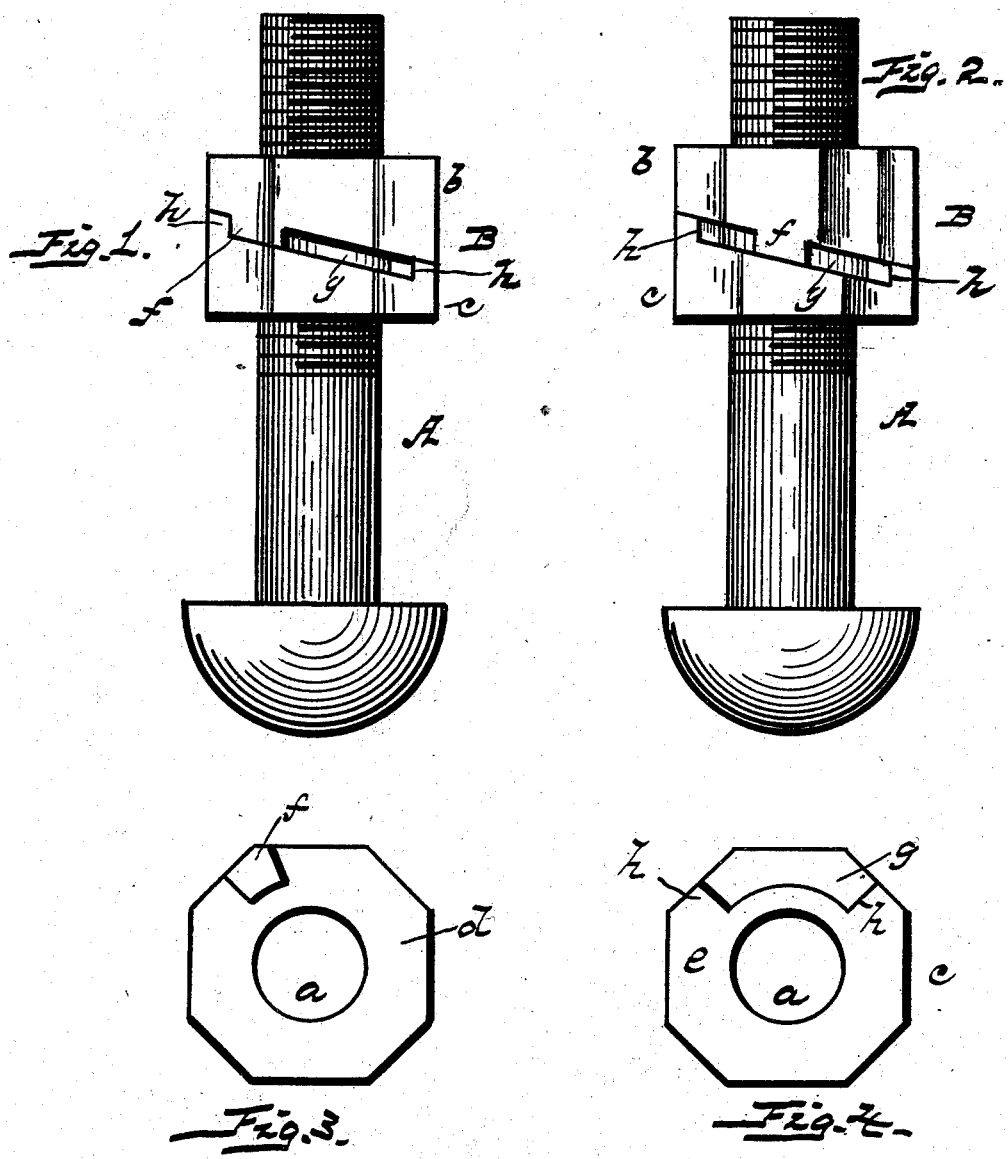

CHARLES L. DUNHAM, OF CENTERVIEW, OHIO.

NUT-LOCK.

SPECIFICATION forming part of Letters Patent No. 705,743, dated July 29, 1902.

Application filed November 29, 1901. Serial No. 84,021. (No model.)

*To all whom it may concern:*

Be it known that I, CHARLES L. DUNHAM, a citizen of the United States, residing at Centerview, in the county of Monroe and State of Ohio, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to improvements in that class of devices known as "nut-locks;" and it consists in the novel construction of the nut, all as will be hereinafter fully explained.

The annexed drawings, to which reference is made, fully illustrate my invention, in which—

Figure 1 represents a side view of an ordinary screw-threaded bolt having my device applied thereto and showing the same in an unlocked position. Fig. 2 is also a side view of the same, showing the device in a locked position, preventing the nut from turning in either direction upon the bolt. Fig. 3 is a face view of one of the sections of the nut having the lug; and Fig. 4 is a face view of the other section, showing the recess in the edge thereof.

Referring by letter to the accompanying drawings, A designates a bolt of any well-known construction having the usual male screw-threads.

B indicates a nut which is constructed in a peculiar manner, the same having the central opening $a$ similar to the well-known nuts and having female screw-threads to receive the male threads of a bolt. This nut B is designed as a whole and when in use upon a bolt is so represented and forms an individual female screw-threaded nut. Said nut is divided about its center, providing sections $b$ and $c$, and the inner or meeting faces of each section are perfectly flat and smooth, and in forming this nut the adjacent face of each section is made on a bias, which provides each inner face $d$ and $e$ with a beveled surface, and the front portion $b$ is provided near or at its upper edge with a lug or projection $f$, while the inner portion $c$ is constructed with a recess $g$, having at each end shoulders or stops $h\, h$ for a purpose presently explained.

Having thus described the construction of my individual nut, I will now proceed and explain its operation.

In applying my nut to a male screw-threaded bolt of any well-known construction the nut is screwed thereon in the usual manner, and when the nut is screwed either home or at any desired point on the bolt the front of the nut is then turned in an opposite direction to that of screwing it on said bolt, thus through the medium of the inner smooth beveled faces the nut expands in the direction of the bolt upon which it may be screwed, thus firmly and with immense pressure of the female threads of said nut grasp the male screw-threads of the bolt and hold the nut securely and preventing it from turning in either direction. In unlocking the nut the operator simply gives the front of said nut a turn in a reverse direction to that in locking it, thus bringing the nut to its normal position or unlocked condition.

It will be observed from the above description, when taken in connection with the accompanying drawings, that my nut is applicable to any ordinary bolt having male screw-threads, and when locked to a bolt the same is prevented from accidental displacement. The lug and shouldered recess are designed to limit the turning of the front of the nut.

What I claim, and desire to secure by Letters Patent, is—

1. The within-described nut-lock, comprising two sections, one section having an inward-projecting lug and the other section being provided with a recess, having shoulders at each end thereof, said sections having adjacent inclined faces, said inclinations extending in a straight plane from one side of the nut to the opposite side, substantially as described.

2. A nut applicable to screw-threaded bolts, the same being divided about its center in a diagonal plane, forming two sections, the adjacent faces thereof presenting straight flat surfaces, one section provided with a lug and the opposite section provided with a recess, having shoulders or stops, whereby the movement of the locking-section is controlled in manipulating the nut, substantially as described.

In testimony whereof I affix my signature in presence of two witnesses.

CHARLES L. DUNHAM.

Witnesses:
GEO. E. FRECH,
E. H. BATES.